United States Patent
Hussain et al.

(10) Patent No.: US 10,691,501 B1
(45) Date of Patent: Jun. 23, 2020

(54) COMMAND INVOCATIONS FOR TARGET COMPUTING RESOURCES

(71) Applicant: Amazon Technologies, Inc., Seattle, WA (US)

(72) Inventors: Amjad Hussain, Bellevue, WA (US); Steven Merlin Twitchell, Renton, WA (US); Emily Grace Aimette Freebairn, Seattle, WA (US); Sung Wook Kim, Sammamish, WA (US); Sivaprasad Venkata Padisetty, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 504 days.

(21) Appl. No.: 15/334,124

(22) Filed: Oct. 25, 2016

(51) Int. Cl.
*G06F 9/46* (2006.01)
*G06F 9/50* (2006.01)
*G06F 9/48* (2006.01)

(52) U.S. Cl.
CPC ............ *G06F 9/5083* (2013.01); *G06F 9/485* (2013.01); *G06F 9/5077* (2013.01)

(58) Field of Classification Search
CPC ........................................................ G06F 9/52
USPC ........................................................ 718/104
See application file for complete search history.

(56) References Cited

U.S. PATENT DOCUMENTS

| | | | | |
|---|---|---|---|---|
| 6,952,726 B1 * | 10/2005 | White | ................... | G06F 9/5044 709/224 |
| 7,451,445 B1 * | 11/2008 | Eppstein | ............... | G06F 9/4843 718/100 |
| 8,433,771 B1 * | 4/2013 | Ellsworth | ............. | H04L 67/125 709/213 |
| 9,485,323 B1 * | 11/2016 | Stickle | ..................... | H04L 67/32 |
| 2004/0236826 A1 * | 11/2004 | Harville | ............ | H04L 29/06027 709/203 |
| 2007/0050774 A1 * | 3/2007 | Eldson | ..................... | G06F 8/447 718/104 |
| 2007/0127057 A1 * | 6/2007 | Bridges | ................. | G06F 3/1207 358/1.15 |
| 2009/0083745 A1 * | 3/2009 | Shen | ....................... | G06F 9/485 718/103 |
| 2009/0265710 A1 * | 10/2009 | Shen | ................... | G06F 11/1438 718/101 |
| 2010/0050180 A1 * | 2/2010 | Amsterdam | .......... | G06F 9/5027 718/104 |
| 2010/0070336 A1 * | 3/2010 | Koegler | ................. | G06Q 10/06 705/7.29 |
| 2010/0262975 A1 * | 10/2010 | Reysa | ................... | G06F 9/5077 718/105 |
| 2012/0215598 A1 * | 8/2012 | Georgis | ................. | G06Q 30/00 705/14.4 |

(Continued)

*Primary Examiner* — Mehran Kamran
(74) *Attorney, Agent, or Firm* — Thorpe North & Western, LLP

(57) ABSTRACT

A technology is described for invoking a command over a set of computing instances. An example method may include receiving a request to invoke a command over a set of computing instances managed within a service provider environment. In response, the computing instances included in the set of computing instances having an attribute may be identified and the command may be sent to the computing instances according to a send rate parameter specifying a rate at which the command is sent to a portion of the computing instances. Execution status indications may be received from the computing instances, wherein a number of errors indicated by the computing instances that exceeds an error threshold terminates execution of the command.

19 Claims, 8 Drawing Sheets

(56) References Cited

U.S. PATENT DOCUMENTS

| | | | | |
|---|---|---|---|---|
| 2012/0221717 A1* | 8/2012 | Sela | G06F 11/2294 | 709/224 |
| 2013/0132461 A1* | 5/2013 | Patel | G06F 9/547 | 709/202 |
| 2013/0254771 A1* | 9/2013 | Musayev | G06F 9/4843 | 718/101 |
| 2014/0101299 A1* | 4/2014 | Cherel | G06F 9/468 | 709/223 |
| 2014/0229761 A1* | 8/2014 | Okubo | G06F 11/073 | 714/6.11 |
| 2014/0237468 A1* | 8/2014 | Desai | G06F 9/5077 | 718/1 |
| 2014/0298343 A1* | 10/2014 | Rajan | G06F 9/5027 | 718/102 |
| 2014/0379899 A1* | 12/2014 | Das | H04L 43/0876 | 709/224 |
| 2015/0139082 A1* | 5/2015 | Banks | H04W 48/08 | 370/329 |
| 2015/0261570 A1* | 9/2015 | Goldman | G06F 9/4881 | 718/102 |
| 2015/0263900 A1* | 9/2015 | Polyakov | H04L 67/10 | 709/203 |
| 2015/0281436 A1* | 10/2015 | Kumar | H04M 3/42008 | 379/68 |
| 2015/0324229 A1* | 11/2015 | Valine | G06F 9/4887 | 718/104 |
| 2016/0028677 A1* | 1/2016 | Narasimhan | H04L 51/22 | 709/203 |
| 2016/0142369 A1* | 5/2016 | Jiang | H04L 45/745 | 709/223 |
| 2016/0224394 A1* | 8/2016 | Farhan | H04L 67/1002 | |
| 2016/0342637 A1* | 11/2016 | Braghin | G06F 9/5055 | |
| 2016/0344671 A1* | 11/2016 | Hussain | H04L 51/046 | |
| 2017/0118247 A1* | 4/2017 | Hussain | H04L 41/22 | |
| 2017/0139462 A1* | 5/2017 | Potlapally | G06F 1/28 | |
| 2017/0139754 A1* | 5/2017 | Moreno | G06F 9/5044 | |
| 2018/0039567 A1* | 2/2018 | Rajagopalan | G06F 11/3672 | |
| 2018/0074855 A1* | 3/2018 | Kambatla | G06F 9/505 | |

* cited by examiner

COMMAND INVOCATIONS FOR TARGET COMPUTING RESOURCES

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

Customers of a service provider may remotely manage the configuration of computing instances using individual commands sent to the computing instances. For example, commands may be used to update software installed on a computing instance, stop or start a computing instance, determine a dynamic structure of a distributed application hosted by computing instances, as well as other commands associated with managing computing instances. The customers may remotely configure their computing instances by sending commands using a service provider console.

DETAILED DESCRIPTION

A technology is described for invoking a command over a set of targets, for example computing resources managed within a service provider environment or computing resources located at a customer's premises. The targets may be managed computing resources provided by a service provider. Managed computing resources provided by the service provider may include, but are not limited to: computing instances, virtualized storage, data storage services, virtualized network resources, as well as other managed computing resources. Similarly, these computing resources need not be managed by a service provider environment and instead could be located at a customer's premises. A target may include a software agent that runs on the computing resource, which may facilitate receiving commands and manage running of those commands on the computing resource, for example reporting statuses, errors, messages, etc. For the sake of convenience, this disclosure will primarily describe targets in the context of computing instances with the understanding that other target computing resources are within the scope of this disclosure.

A command may instruct a software agent hosted on a target computing instance to perform an administrative task, such as collect information or perform an action. The rate at which the command may be distributed to the computing instances may be managed, allowing the command to be invoked over the set of computing instances in batches. For example, the technology may allow a customer of a service provider to submit a request to a command service to invoke a command in batches over time until the command has been executed on individual target computing instances specified in the request. A computing instance may be a virtualized instance of a software implementation of a machine (a computer) that executes applications like a physical machine.

The technology may allow for invoking a command over a large set of computing instances, which may exceed hundreds, thousands or even millions of computing instances. In the past, management services have been configured to invoke a command over a few computing instances in parallel. Customers wanting to manage larger sets of computing instances have been unable to do so using the existing management services. As a result of the current technology, a customer may submit a request to a command service to invoke a command over a large set of computing instances and the command may be invoked at a rate controlled by the customer or a default rate. Moreover, the customer may monitor the progress of a command invocation over the set of computing instances and specify error termination conditions which terminate invocation of the command.

Figure 1:
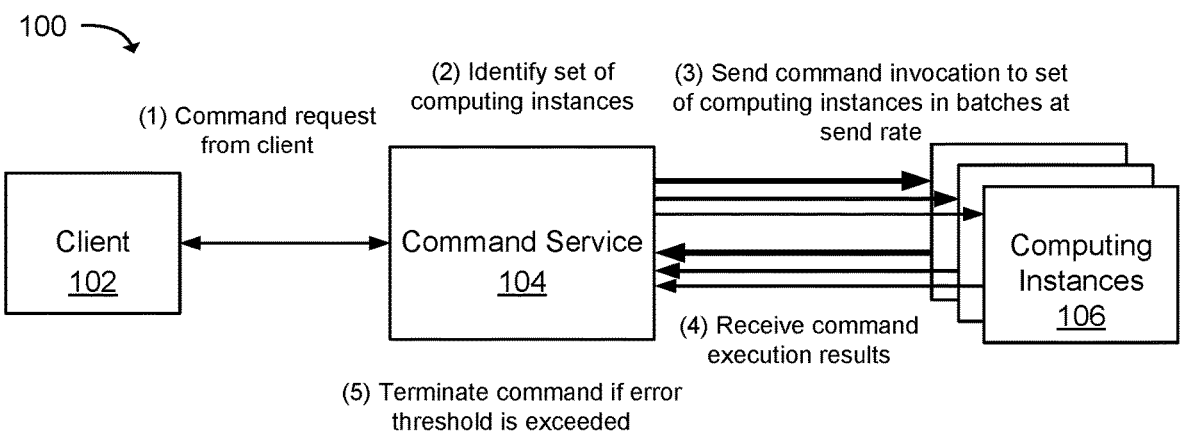
FIG. 1 is a block diagram illustrating an example system and method for invoking a command in batches over a set of computing instances.

To further describe the technology, examples are now provided with reference to the figures. Accordingly, FIG. 1 is a diagram illustrating a high level example of a system and method 100 that may be used to remotely invoke a command over a set of computing instances 106. The system 100 may include a command service 104 configured to receive requests from clients 102 to invoke a command over a set of computing instances 106. In one example, a command request received from a client 102 may specify a command to invoke and may include an attribute associated with computing instances 106 used to identify computing instances 106, having the attribute, which are to receive instructions to execute the command. For example, the command request may include one or more tags used to identify computing instances associated with the tags. In another example, the request may explicitly identify computing instances 106 that are to receive instructions to execute the command. In yet another example, the request may identify a group of computing instances 106, such as a security group, an auto scaling group, a private network group, etc. For example, the request may include a list of resource identifiers, a computing instance name, or a public or private network address assigned to the computing instances 106.

In receiving a request, the command service 104 may be configured to send command invocations (e.g., instructions to execute a command) to a set of computing instances 106 at a send rate. For example, in response to a request to invoke a command, messages containing instructions to execute the command may be sent to the computing instances 106 at a rate determined by a send rate. The send rate may be defined by a customer or a service provider.

In one example, a send rate may be defined as a number of command invocations to send to computing instances 106 in a set of computing instances 106 over a defined time period (e.g., commands per second). As an illustration, a customer that manages a large set of computing instances (e.g., 100,000 computing instances) may define a send rate that allows command invocations to be sent to the computing instances at a rate of one hundred command invocations per second until the command invocation has been sent to each of the computing instances included in the set.

In another example, a send rate may specify a command invocation batch size and a time interval between sending a command invocation batch. As an illustration, a customer may define a send rate that allows batches of one hundred command invocations to be sent in parallel to computing instances with a time interval of ten seconds between sending command invocation batches.

In yet another example, a send rate may be defined to specify a maximum concurrency of computing instances 106 that are executing the command at a given time. For example, a customer may define a send rate to allow no more than a specified number or percentage of computing instances 106 to execute a command at a time. As a specific example, a send rate may be defined to allow no more than 5% of the customer's computing instances 106 to execute a software update at any given time. As commands complete on the computing instances 106, additional command invocations may be sent to other computing instances 106 in the set, such that the number of computing instances 106 in the set executing the command may be no more than 5% at any given time until the command has been executed on each computing instance 106 included in the set.

In addition to a send rate, error behavior may be configured to terminate a command in the event that a number of errors detected exceed an error threshold. For example, the command service 104 may receive command execution results from the computing instances 106. The command service 104 may track a number of command execution results that indicate an error occurred in executing the command, as well as track a number of timeouts for command invocations. In the case that a number of errors (including timeouts) exceed the error threshold, the invocation of the command may be terminated. The error threshold may be defined as a maximum number of errors, or a percentage of errors (including timeouts). As a specific example, a customer may request invocation of a command that updates a database software package for database servers executing on the customer's computing instances 106. Because failed updates are likely to leave the database servers in a state where the database servers are unable to respond to queries, the customer may request that the command be sent with a maximum concurrency of 4% and to allow no more than two failed invocations. In the event that the update fails three times, exceeding the error threshold of two failed invocations, the command service 104 terminates the command and any further command invocations and sets an overall command status to "failed".

A customer may be provided with command progress allowing the customer to monitor the progress of the command invocation over a set of computing instances 106. In one example, command progress may be provided via a command console (not shown) or API (Application Program Interface) accessible to the customer. As an illustration, an amount of time to invoke a command over a set of the customer's computing instances 106 may allow the customer to monitor the progress of the command invocation, based in part on a send rate defined by a customer. As such, after requesting the command, the customer may monitor the status of the command via the command console, which may include progress bars showing the number of command invocations that have completed successfully and the number of command invocations having error statuses of "failed" or "timed out".

Figure 2:
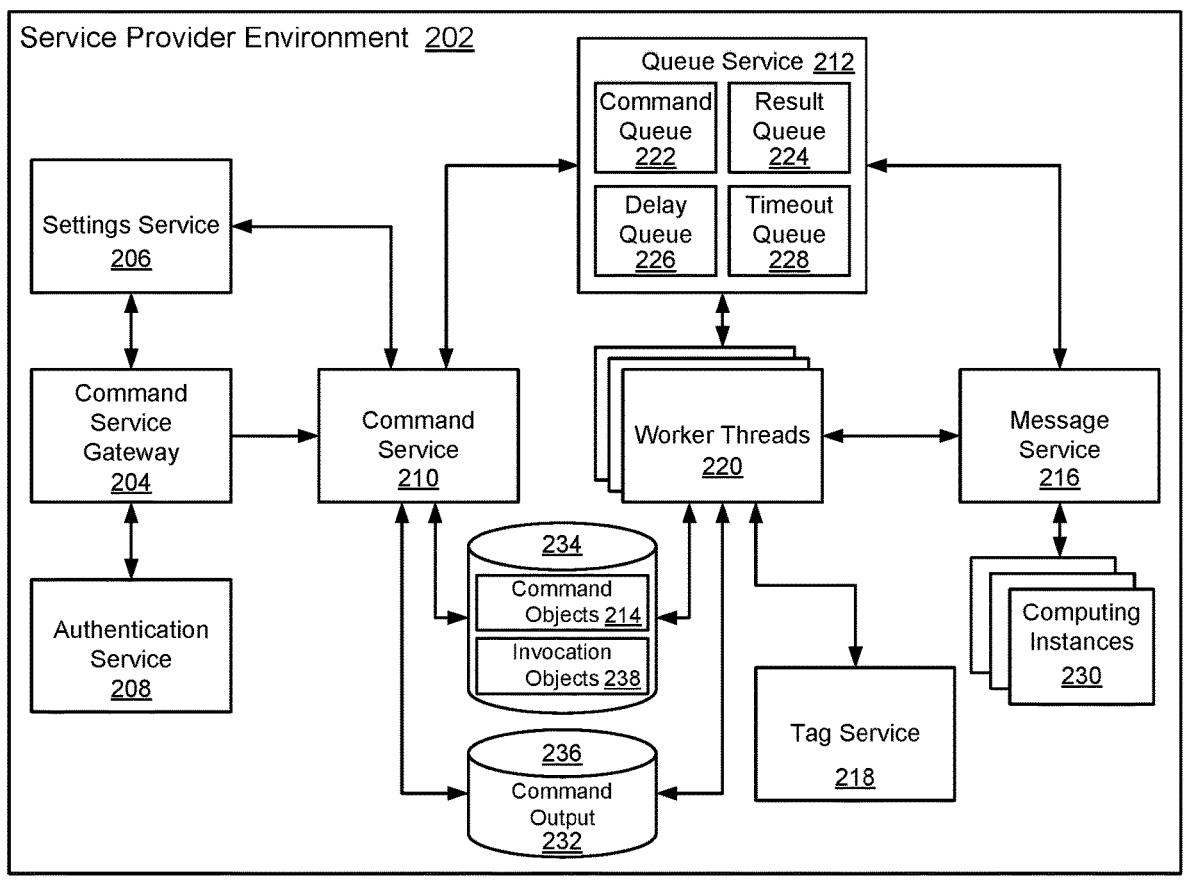
FIG. 2 is a block diagram that illustrates various example components included in a system for invoking a command over a set of computing instances.

FIG. 2 illustrates a more detailed description of components included in an example system 200 on which the present technology may be executed. The system 200 may be hosted in a service provider environment 202 and may be made accessible to customers of a service provider and the customer's computing instances located at the customer's premises. The service provider environment 202 may include computing resources for executing computing instances 230. Also, the components or compute resources (e.g., servers) shown in the service provider environment 202 may be implemented using computing instances. The service provider environment 202 is described in greater detail later in association with FIG. 4.

As illustrated, the system 200 may include a number of services used to distribute commands to a set of computing instances 230 having software agents installed that execute the commands. The system 200 may include a command service gateway 204 configured to receive requests from clients, authenticate clients associated with the requests, and obtain settings used in fulfilling the requests. A request from a client may be related to invoking a command, canceling a command, or providing results associated with invoking a command. The command service gateway 204 may authenticate a customer associated with a request using an authentication service 208. For example, the command service gateway 204 may be configured to send authentication credentials (e.g., a customer signature) in a request to the authentication service 208 configured to validate the authentication credentials.

Also, the command service gateway 204 may be configured to enforce API (Application Program Interface) call limits imposed on a customer. For example, a customer may be limited to making a specified number of API calls over a defined time period (e.g., a customer may be limited to fifty calls per minute). The command service gateway 204 may be configured to obtain customer settings associated with a customer from a settings service 206, which may be configured to provide the customer settings in response to requests. A determination may be made whether the customer is authorized to make a request at that time. Requests determined by the command service gateway 204 to be valid may be forwarded to a command service 210.

The command service 210 may be configured to handle requests associated with invoking commands over a set of computing instances 230, canceling existing commands, and providing status and/or results for commands. A send command (i.e., a request to invoke a command over a set of computing instances 230) may be handled by the command service 210 as constrained by customer settings from the settings service 206. The customer settings may include command parameters, such as a send rate parameter specifying a rate at which a command may be sent to a set of computing instances 230 and an error threshold parameter indicating a number of errors that may be incurred before execution of a command is terminated. The send rate parameter and the error threshold parameter may be set by a customer. For example, a customer may specify a send rate at which messages containing instructions to execute a command are sent to the customer's computing instances 230, and the customer may specify a number of errors that may be incurred by the computing instances 230 executing the command before terminating invocation of the command over the set of the customer's computing instances 230. Alternatively, a send rate and/or error threshold may be controlled by a service provider, or the service provider may set a default send rate and/or error threshold that may be overridden by a customer.

After obtaining the customer settings, the command service 210 may be configured to create a command object 214 (e.g., a database entry, XML (Extensible Markup Language) document, or JSON (JavaScript Object Notation) document) for the command. The command object 214 may include information used to invoke the command. For example, the command object 214 may specify the command that is to be invoked (e.g., an administrative task), computing instance identifiers or one or more computing instance tags assigned to a set of computing instances, and the command parameters obtained from the settings service 206. Also, the command object 214 may be used to represent a state of the command (e.g., executing, in-progress, or terminated). Command objects 214 may be managed using a storage service 234. In one example, a NoSQL (non-relational) data store service may be used to store and manage command objects 214.

The command service 210 may be configured to put a send command notification into a command queue 222 for processing by a worker thread 220, as described below. The send command notification may be sent to a queue service 212 configured to manage the command queue 222, as well as a delay queue 226, a timeout queue 228, and a results queue 224. The queue service 212 may be a distributed queue system that enables services to queue messages for consumption by other services and service components. A queue may be a temporary repository for messages that are waiting for processing by a service or service component. The queue service 212 may ensure delivery of each message at least once, and may support multiple readers and writers interacting with a particular queue. A queue may be used simultaneously by multiple services and service components without any need to coordinate between the services and service components.

Worker threads 220 may be configured to perform tasks associated with command requests. In particular, a worker thread 220 may comprise a process or application configured to perform different tasks associated with command requests in parallel. Worker threads 220 may be managed using a thread management service (not shown). Tasks performed by a worker thread 220 may include: creating command invocations (instructions for a target to execute a command) for each command target (i.e., a computing instance 230) in response to a send command request; dispatching command invocations over time while enforcing execution concurrency constraints (e.g., maximum number of executing commands) and send rates for a customer and/or the system 200; updating a command object 214 and command output 232 to indicate the results of command invocations; and performing bulk state changes for command objects 214 and invocation objects 238 when command execution is canceled by a customer or terminated as a result of an error threshold being exceeded.

Because invocation of a command over a set of computing instances 230 may take a significant amount of time to complete when the number of command targets is large, worker threads 220 may be configured to use queues (e.g., the command queue 222, delay queue 226, timeout queue 228, and results queue 224) to distribute work among the worker threads 220. The queues may be used to provide a reliable method for tracking in-progress work and distributing work more fairly among the worker threads 220. Further, the use of the queues enables scale out, such that when worker threads 220 are added to the system 200, the worker threads 220 may automatically start pulling work from the queues and overall throughput may be increased.

The commands queue 222 may contain send command notifications and cancel notifications. As described above, the command service 210 may be configured to put a send command notification in the command queue 222 for processing by a worker thread 220. In response to receiving the send command notification at the command queue 222, a worker thread 220 may be assigned to process the send command. The worker thread 220 assigned to process the send command may create a timeout message containing a command ID and put the timeout message, with a visibility timeout set to a delivery timeout value for the command, into the timeout queue 228. A visibility timeout may cause a message to be hidden from the worker threads 220 for a defined period of time. As an example, a timeout message placed in the timeout queue 228 may be made invisible to the worker threads 220 for the duration of a delivery timeout value, such that a worker threads 220 does not retrieve the timeout message from the timeout queue 228 until the expiration of delivery timeout value. A delivery timeout value may be set to a period of time in which a software agent on a computing instance 230 may be expected to execute a command and report back that the command was executed. When the visibility timeout expires, the message may be exposed to the worker threads 220, one of which may retrieve the timeout message from the timeout queue and determine whether the command invocation associated with the command ID has timed out, as described later.

Next, the worker thread 220 may identify the target set of computing instances 230 that are to receive command invocations. The worker thread 220 may obtain the command object 214 from the storage service 234 using the command ID included in the command notification. As indicated earlier, the command object 214 includes information used to invoke the command. Namely, the command object 214 may identify the command that is to be invoked, identifiers or tags assigned to computing instances 230 that are to receive the command, and command parameters for invoking the command over the computing instances 230. In the case that the command object 214 includes one or more tags associated with computing instances 230, identifiers for the computing instances 230 associated with the tags may be obtained from a tag service 218. The tag service 218 may be configured to identify and provide identifiers for computing instances 230 assigned a tag. A tag may be metadata that may be assigned by a customer or application to a computing instance 230. The tag may help customers manage their computing instances 230 by allowing the customers to categorize their computing instances 230 in different ways, such as by computing instance purpose, owner, or environment. Assigning tags to computing instances 230 enables the computing instances 230 to be identified using the tags. In the case that a large number of computing instances 230 are associated with a tag(s), the tag service 218 may be configured to provide identifiers for the computing instances 230 one page at a time as described in association with FIG. 6.

For each computing instance 230 identified as receiving the command, the worker thread 220 may create an invocation object 238 that represents a state of the command execution on a computing instance 230 instructed to execute the command via a software agent. The invocation objects 238 may be stored to the storage service 234 configured to manage the invocation objects 238. The initial state of the invocation objects may be set to pending. The worker thread 220 may select a number of target computing instances for which to invoke the command. The worker thread 220 then determines whether the number of invocations objects 238 for the target computing instances selected is in excess of the send rate parameter specified in the command object 214. The send rate parameter indicates a rate at which to invoke the command as described earlier. In the case that the number of invocations objects 238 is in excess of the send rate parameter, a delay message for each invocation object 238 that exceeds the send rate may be added to the delay queue 226. The delay message may include a command ID that links the delay message to a target computing instance 230. The delay message may be retrieved from the delay queue 226 after a specified amount of time (e.g., one second) as described later.

The worker thread 220 may generate command messages for each of the invocation objects 238 that are not in excess of the send rate parameter. A command message may include instructions for a software agent on a target computing instance 230 to execute the command. The worker thread 220 then dispatches the command messages to a message service 216 for distribution to target computing instances 230. The message service 216 may be configured to deliver messages to intended recipients. In one example, a command message addressed to a target computing instance 230 may be sent to the message service 216. The message service 216 may store the command message until a request for the command message is received from the computing instance 230. Thereafter, the message service 216 may be configured to deliver the command message to the computing instance 230. After sending the command message to the message service 216 an invocation object 238 associated with the computing instance 230 that received the command message may be updated to indicate that the command is in-progress. For example, a target computing instance 230 that received the command message may send a message acknowledgement back to the message service 216 indicating that the command message was delivered, whereupon a status message may be placed on the result queue 224 for processing by a worker thread 220 that updates the invocation object 238.

The worker threads 220 may receive delay messages from the delay queue 226. As indicated above, the delay queue 226 may contain delay messages associated with command invocations whose dispatch to target computing instances 230 exceeded a send rate. A delay message added to the delay queue 226 may be stored in the delay queue 226 for a period of time (e.g., one second), and thereafter, the delay message may be assigned to a worker thread 220 for processing. The delay message may contain a command ID used to identify an invocation object 238 for a target computing instance 230. More specifically, the command ID may be linked to an invocation object 238. The worker thread 220 assigned to process the delay message may determine the status of the invocation object 238 by retrieving the invocation object 238 linked to the command ID included in the delay message.

In the case that the status of the invocation object 238 is not cancelled or timed out, then the worker thread 220 may attempt to send the command invocation to the target computing instance 230. That is, the worker thread 220 may determine whether the send rate allows the command invocation to be sent to the computing instance 230, and if so, generates a command message which may be dispatched to the message service 216.

In the event that the send rate does not allow the command invocation to be delivered to the target computing instance 230, a new delay message with a visibility timeout may be added to the delay queue 226. In one example, the visibility timeout may be doubled from a previous visibility timeout value, up to a maximum visibility timeout value. As a specific example, a new visibility timeout for a delay message may be doubled from a previous visibility timeout of one minute, up to a maximum of five minutes. As such, delivery of a command invocation may be retried by adding delay messages associated with the command invocation to the delay queue 226 repeatedly until the command invocation is delivered to a target computing instance 230, or until the command is cancelled.

The result queue 224 may contain status messages (e.g., message acknowledgements) received from the message service 216 indicating that a command message has been delivered to a computing instance 230 as described above. The results queue 224 may also contain result messages from software agents hosted on computing instances 230 indicating that command execution has successfully completed. For example, after command execution on a target computing instance 230 completes, a software agent on the computing instance 230 may send a message to the message service 216 indicating that the command has been executed. The message service 216 may add the result message to the result queue 224 and the result message may be assigned to a worker thread 220 for processing. As part of processing the result message, the worker thread 220 may write command output 232 included in the result message to a file or object storage managed by a storage service 236. Command output 232 may include information related to executing a command on a computing instance 230. As an example, a command to update a software package on a computing instance 230 may generate command output 232 that includes status information for the software package update. A customer may request the command output 232 by sending the request to the command service 210, which may be configured to obtain the command output 232 from the storage service 236 and return the command output 232 to the customer Also, as part of processing the result message, the worker thread 220 may update the invocation object 238 associated with the result message to indicate the status of the command execution indicated by the result message. The result message may include a command ID that links the result message to the invocation object 238, allowing the worker thread 220 to identify the invocation object 238. Illustratively, the worker thread 220 may update the invocation object 238 according to the result message to indicate that command execution by the software agent on the target computing instance 230 succeeded, failed, or timed out. Also, the worker thread 220 may update the invocation object 238 to include a reference to command output 232 included in the result message and stored to the storage service 236.

In one example, a command invocation may cause a computing instance 230 to perform several actions, each of which may cause a result message indicating a status of the action to be placed on the result queue 224 for processing by a worker thread 220. In processing a result message, a worker thread 220 may query a command object 214 associated with the command invocation to determine whether additional result messages are expected. The command object 214 associated with the command invocation may indicate that multiple actions are performed in executing the command. Results for each action may be tracked and upon receiving results for each action, an invocation object 238 associated with the command invocation may be updated to indicate the status of the command invocation. For example, the invocation object 238 may be updated to indicate success when each action succeeds, updated to indicate failure when one or more actions fail, or updated to indicate timed out when no action failed, but at least one action timed out.

In the event that a command invocation fails or times out, a worker thread 220 may be configured to increment a failed field or timed out field included in a command object 214 associated with the command. In doing so, the worker thread 220 may determine whether the value of the failed field and/or the timed out field of the command object 214 exceeds an error threshold. In the case that the error threshold has been exceeded, the worker thread 220 may then update the command object 214 to indicate that the command invocation failed or timed out, and update each invocation object 238 that has a status of in-progress as terminated.

The timeout queue 228 may contain timeout messages that include command IDs for command invocations that have been dispatched to computing instances 230, starting a "delivery timeout clock" for the command invocations. For example, after successfully sending a command message to the message service 216, a worker thread 220 may place a timeout message with a command ID on the timeout queue 228 with a visibility timeout set to an execution timeout of the command (an amount of time that a computing instance 230 is expected to execute the command). As such, the execution timeouts may be used to determine that a target computing instance 230 has stopped (e.g., terminated) before a result message could be placed on the result queue 224.

In the event that a delivery timeout for a timeout message expires, the timeout message becomes visible in the timeout queue 228 and the timeout message may be assigned to a worker thread 220 for processing. The timeout message may include a command ID that links the timeout message to an invocation object 238. In one example, the worker thread 220 assigned to process the timeout message may update an invocation object 238 associated with the command ID to indicate that the command invocation failed and increment the timed out field of the command object 214. A determination may then be made whether an error threshold has been exceeded as a result of the command invocation timing out. In the case that the error threshold has been exceeded, the worker thread 220 may update the command object 214 to indicate that the command invocation failed, and update each invocation object 238 that has a status of pending or in-progress as terminated. In the case that there are no invocation objects 238 that have a state of pending or in-progress, the worker thread 220 may determine a final status of the command. In one example, the status of the command object 214 may be set to timed out when a number of invocation objects 238 indicating timed out exceeds the error threshold. Otherwise, the status of the command object 214 may be set to success when the error threshold has not been exceeded by the number of invocation objects 238 indicating timed out.

The command as a whole may be monitored to detect a timeout of the command. For example, the command (which includes individual command invocations) may be expected to complete within a certain amount of time (e.g., a few minutes, hours, or longer). Therefore, after the amount of time has passed, a determination may be made whether the command, as a whole, has completed. In one example, a worker thread 220 assigned to process the command may place a command timeout message on the timeout queue 228 with a visibility timeout set to an amount of time expected for the command to successfully be executed by software agents on the set of computing instances 230. When the command timeout message becomes visible in the timeout queue 228, a determination may be made whether the command has completed, and if not, the command object 214 for the command may be updated to indicate that the command timed out.

The command service 210 may be configured to handle a cancel command request received from a customer by marking a command object 214 associated with the cancel command as "cancelled" and putting a cancel notification to the command queue 222 for processing by a worker thread 220 as described below. Also, the command service 210 may be configured to receive requests for information related to a send command, such as a listing of active command invocations and command invocation results. In response to a request for information related to a send command, the command service 210 may retrieve command output 232 associated with a send command and provide the command output 232 to a client that requested the information.

In the event that a request to cancel a command is received at the command service 210, a cancel message may be placed on the command queue 222 and the cancel message may be assigned to a worker thread 220 for processing. The worker thread 220 may be configured to write to a semaphore to the command object 214 indicating to other worker threads 220 dispatching command invocations to the computing instances 230 to terminate. Also, invocation objects 238 associated with the command having a status of pending may be identified and may be updated to cancelled. Computing instances 230 associated with invocation objects 238 having a status of in-progress may be identified, and the worker thread 220 may send cancel messages (via the message service 216) to the computing instances 230 instructing the computing instances 230 to terminate processing of the command. The invocation objects 238 having the status of in-progress may then be updated to cancelled.

The various processes and/or other functionality contained within the system 200 may be executed on one or more processors that are in communication with one or more memory modules. The system 200 may include a number of computing devices that are arranged, for example, in one or more server banks or computer banks or other arrangements. The computing devices may support a computing environment using hypervisors, virtual machine monitors (VMMs) and other virtualization software.

The storage services 234/236 may utilize a plurality of data stores. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the services included in the service provider environment 202 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services. Transport Layer Security (TLS) and Secure Sockets Layer (SSL) may be used in communications with a client. TLS and SSL are cryptographic protocols designed to provide communications security over a computer network.

A network used for communications within the system 200 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain services may be discussed in connection with this technology. In one example configuration, a service may include one or more processes executing on a server or other computer hardware. Such services may be centrally hosted functionality or a service application that may receive requests and provide output to other services or consumer devices. For example, services may be considered on-demand computing that are hosted in a server, virtualized service environment, grid or cluster computing system. An API may be provided for each service to enable a second service to send requests to and receive output from the first service. Such APIs may also allow third parties to interface with the service and make requests and receive output from the services. While FIG. 2 illustrates an example of a system that may implement the techniques above, many other similar or different environments are possible. The example environments discussed and illustrated above are merely representative and not limiting.

Figure 3:
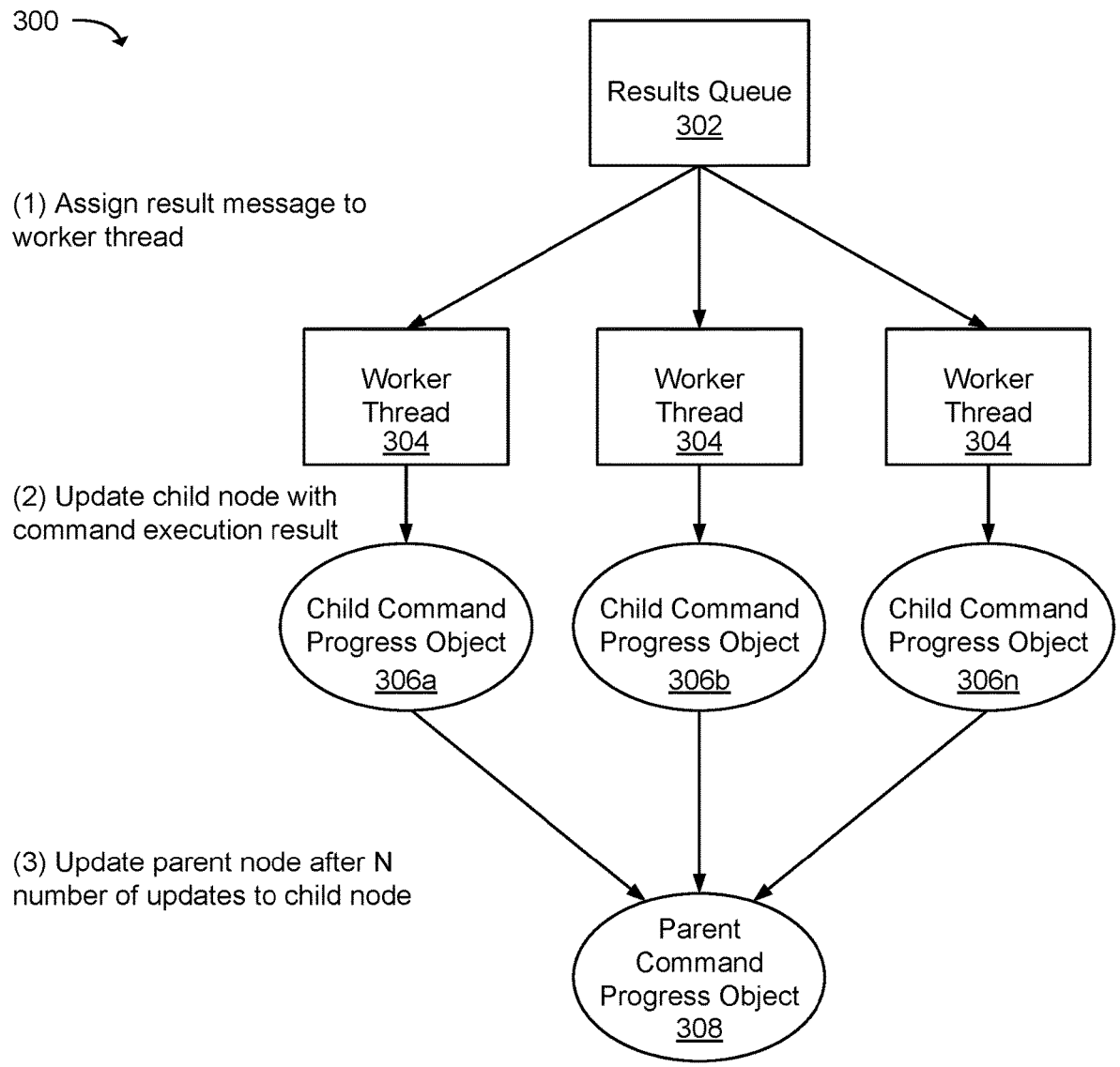
FIG. 3 is a flow diagram illustrating an example system and method for updating a command progress object with execution status indications received from target computing instances.

FIG. 3 is a flow diagram that illustrates an example system and method 300 for updating command progress for invocation of a command over a set of computing instances. In one example, a parent command progress object 308 may be updated with execution status indications received from a set of computing instances. Customers of a service provider may be provided with a progress of a command being executed over the set of the customer's computing instances. In scenarios where the set of computing instances may be large (e.g., hundreds, thousands, or even millions of computing instances), the number of result messages received from the computing instances has the potential to overwhelm the system. For example, writing to a command progress object that represents the progress of a command each time a result message for a command invocation on a computing instance is received may not be possible when result messages are received at a high rate (e.g., up to 500 times per second for command invocations sent to large sets of computing instances).

The system and method 300 illustrated may be used to fan out command results received from computing instances among child command progress objects 306a-n included in a tree data structure in order to help prevent update hotspots in a data store used to store command progress and help minimize the rate at which any given record in the data store is updated to represent the command progress. The tree data structure may include a parent command progress object 308 and child command progress objects 306a-n associated with a plurality target computing instances, each having fields for a total command invocation count, a completed command invocation count, and an error count, for example. In one example, each level in the tree may update a parent after the child command progress objects 306a-n included in the level have been updated with a minimum number of updates. In another example, a child command progress object 306a-n may update a parent command progress object 308 after the child command progress object 306a-n has been updated with a number of updates. The parent command progress object 308 may be queried during execution of a command, allowing a customer to monitor progress of command invocations over a set of the customer's computing instances.

As an illustration, progress for a command that includes twelve command invocations (i.e., the command is sent to a set of twelve computing instances) may be represented using a parent command progress object 308. Each time a command invocation completes on a computing instance, a result message may be added to a results queue 302 and the result message may be assigned to a worker thread 304. The worker thread 304 may then update a child command progress object 306a-n. Illustratively, a child command progress object 306a-n may be assigned to a subset of target computing instances, or a child command progress object 306a-n may be selected using a scheme that sequentially selects child command progress objects 306a-n, or a child command progress object 306a-n may be selected randomly.

After a child command progress object 306a-n has been updated a specified number of times with the results of command invocations, thereby incrementing the child command progress object's fields, the parent command progress object 308 may be updated to increment the fields of the parent command progress object 308 using the values of the child command progress object 306a-n. As an example, after a completed command invocation count for a child command progress object 306a-n has been updated five times, the completed command invocation count for the parent command progress object 308 may be incremented five times.

A number of progress updates made to the parent command progress object 308 may be logarithmic with a number of command invocations for a command. In one example, the fields of the parent command progress object 308 may be incremented using the value of the child command progress object's fields, and the child command progress object's fields may be reinitialized.

Figure 4:
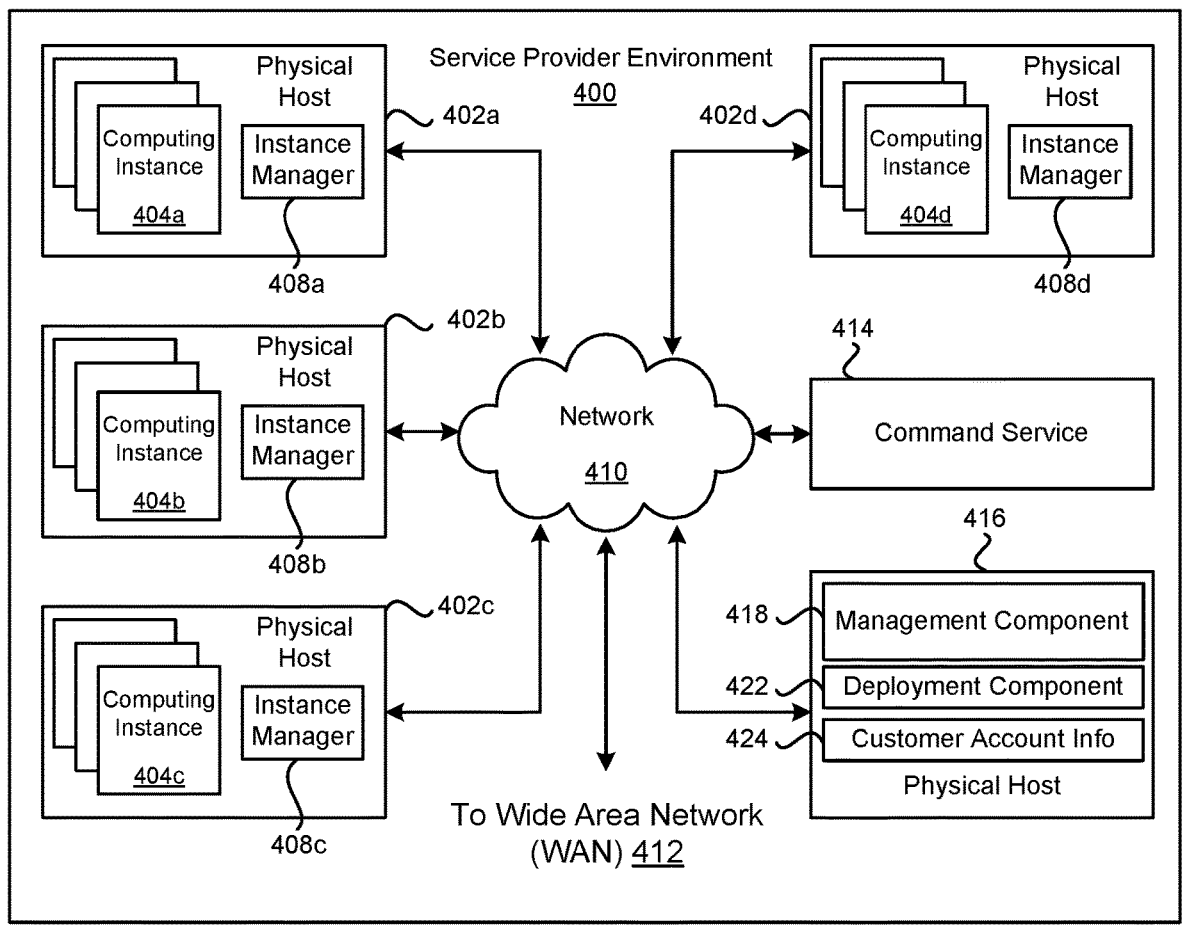
FIG. 4 is a block diagram that illustrates an example computing service environment that includes a command service.

FIG. 4 is a block diagram illustrating an example computing service 400 that may be used to execute and manage a number of computing instances 404a-d. In particular, the computing service 400 depicted illustrates one environment in which the technology described herein may be used. The computing service 400 may be one type of environment that includes computing resources that may be used, for instance, to host computing instances 404a-d. The computing resources may be located at data centers managed by a computing service provider, as well as located at customer data centers on customer premises.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

One or more server computers 414 and 416 may be reserved to execute software components for managing the operation of the computing service 400 and the computing instances 404a-d. For example, a server computer 414 may execute a command service as described earlier. A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified, many more networks and networking devices may be utilized to interconnect the various computing systems disclosed herein.

Figure 5:
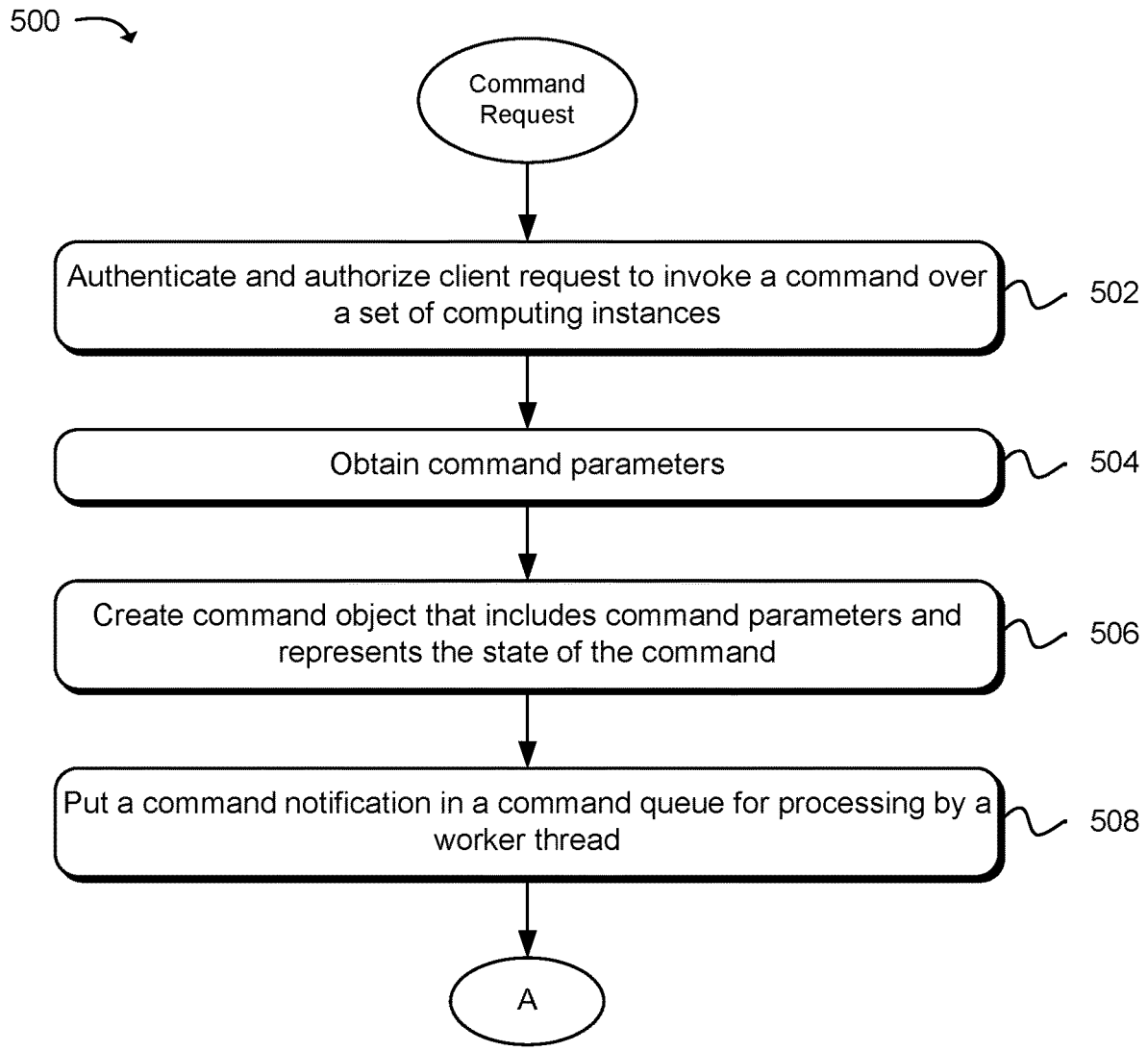
FIG. 5 is a flow diagram that illustrates an example method for processing a command request.

Moving now to FIG. 5, a flow diagram illustrates an example method 500 for processing a command request. The command request may be received from a customer of a service provider, requesting that a command to perform an administrative task be invoked over a defined set of the customer's computing instances. The administrative task may be any task that can be performed by a computing instance (e.g., install a software package, start/stop a computing instance, collect information, etc.). In one example, the request may identify a command to invoke (as well as parameters for executing the command) and one or more tags associated with computing instances used to identify a set of target computing instances, on which the command may be executed.

As in block 502, after a client request to invoke a command over a set of computing instances is received, the client associated with the request may be authenticated and a determination may be made whether the client is authorized to make the request. After the client is authenticated and a determination is made that the client is authorized to make the request, as in block 504, command parameters for invoking the command may be obtained. In one example, the command parameters may include: a send rate parameter used to determine a rate at which command invocations may be sent to target computing instances; and an error threshold parameter specifying a number of errors, or a percentage of computing instances indicating errors, that occur resulting in terminating the command. The command parameters may be associated with a customer account, or the command parameters may be provided by the service provider.

As in block 506, a command object for the command may be created. The command object may include the command parameters described above and target computing instance information included in the request. The command object may be used to represent the status of the command during processing of the command. The command object may be provided to worker threads assigned to process the command, allowing the worker threads to obtain the command parameters and update the command object to represent the status of the command during the course of command invocation.

Having created the command object, as in block 508, a command notification may be placed on a command queue for processing by a worker thread. In one example, the command notification may include a reference to the command object, allowing a worker thread assigned to process the command notification to obtain invocation information (e.g., command type, target computing instances, and command parameters) from the command object as described below.

Figure 6:
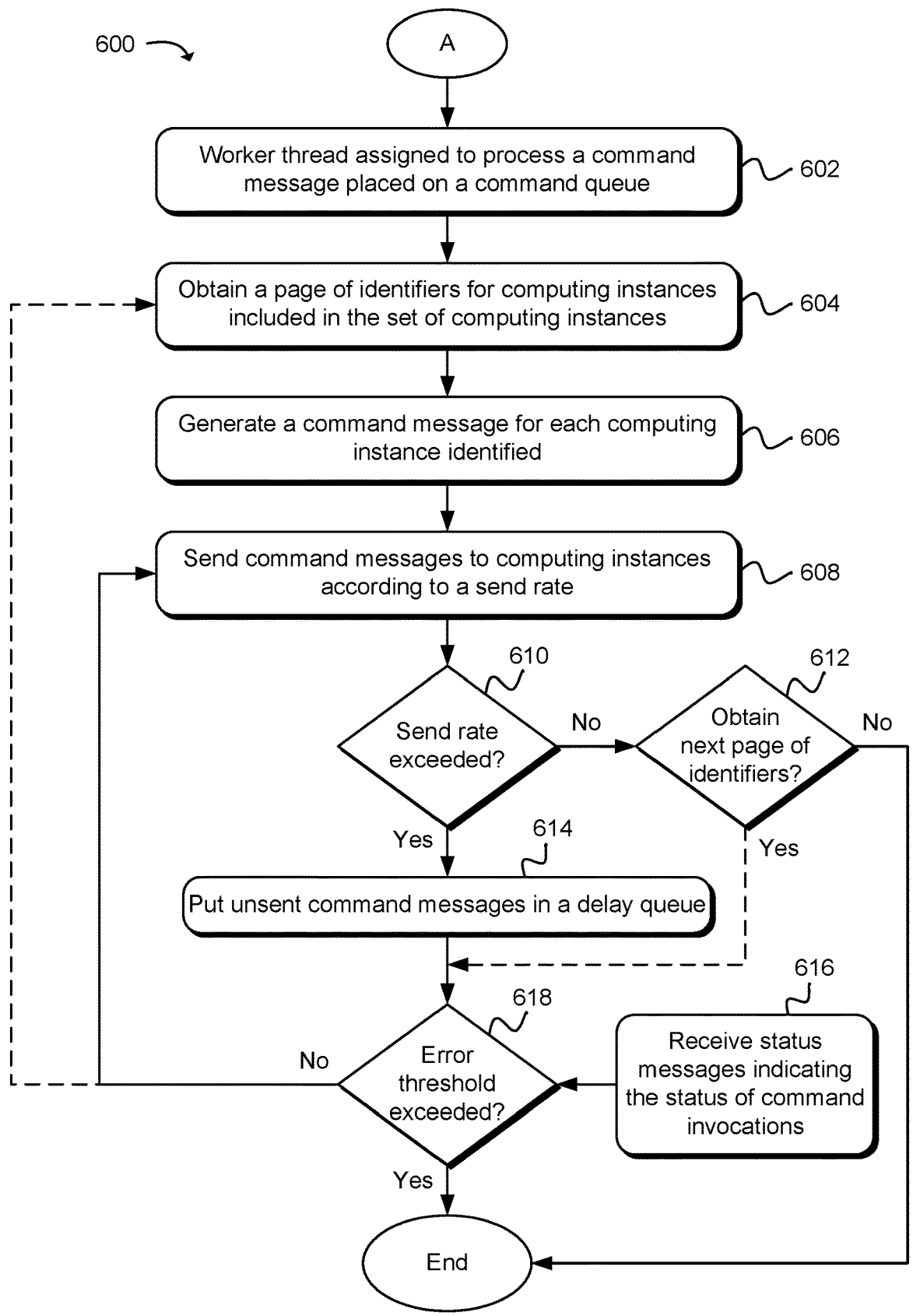
FIG. 6 is a flow diagram illustrating an example method for invoking a command over a set of target computing instances identified using one or more tags.

FIG. 6 is a flow diagram illustrating an example method 600 for invoking a command over a set of target computing instances identified using one or more tags. As described above, in response to a request to invoke a command, a command notification may be placed on a command queue. As in block 602, a worker thread included in a pool of worker threads may be assigned to process the command notification. In one example, the command notification may include a reference to a command object that includes information used to invoke the command. The worker thread may use the reference to obtain the command object and use the information included in the command object to determine the command to be invoked and the set of target computing instances that are to receive the command.

In one example, a set of target computing instances may be identified using one or more tags associated with the target computing instances. For example, the tags may have been received in the request to invoke the command and the tags may be included in the command object when the command object was created. As such, the worker thread assigned to process the command notification may obtain the tags from the command object and use the tags to obtain identifiers for computing instances associated with the tags. As an example, a tag may comprise a key and value (e.g., "HostClass:AdvertisingWebServers") used to describe a set of computing instances. The tag may be submitted to a tag service configured to identify computing instances that have been assigned the tag and return identifiers for the computing instances.

In one example, the tag service may return subsets of computing instance identifiers when a number of computing instances associated with a tag(s) may be in excess of a subset parameter. For example, in response to a request for computing instance identifiers that involves a large set of computing instances (e.g., greater than 50 computing instances), the tag service may provide a page of identifiers for a subset of computing instances in response to a request for the identifiers. In one example, the number of identifiers included in a page may be specified by a customer up to a maximum number of identifiers per page specified by the tag service. The remaining identifiers may be obtained via subsequent requests that return additional pages of identifiers for subsets of computing instances associated with a tag(s).

As in block 604, a first page of identifiers for target computing instances included in the set of computing instances may be obtained. As in block 606, a command message may be generated for each computing instance identifier included in a page of identifiers returned by the tag service. The command message may include instructions for a software agent on a target computing instance to execute the command.

As in block 608, the command messages may be sent to the computing instances according to a send rate. In one example, the send rate may determine a number of command messages that may be dispatched within a defined time period (e.g., commands per second). In one example, a customer may define a send rate that allows command messages to be sent at a specified rate (e.g., 20, 50, 100 command messages per second) until the command messages have been sent to each of the computing instances included in the set. In another example, a send rate may specify a command message batch size and a time interval between sending a command message batch. For example, a customer may define a batch size and a condition that a specified number or percentage of computing instances completes the command before sending a next batch of command messages. In yet another example, a send rate may be defined to specify a maximum concurrency of computing instances that are executing the command at a given time. For example, a customer may define a send rate that allows no more than a specified number or percentage of computing instances to execute a command at a time.

As in block 610, a determination may be made whether the send rate may be exceeded in sending the command messages. In the case that the send rate may be exceeded, a number of command messages that does not exceed the send rate may be sent to target computing instances, and as in block 618, unsent command messages may be placed in a delay queue and sent to target computing instances at a later time as described earlier in relation to FIG. 2, subject to an error threshold not being exceeded.

As in block 616, status messages (e.g., result messages and timeout messages) may be received that indicate the status of command execution (e.g., completed, failed, or timed out) for target computing instances. Status messages indicating that a command invocation has failed or timed out may cause an error count to be incremented. In the case that the error count exceeds the error threshold, then the command may be terminated as described earlier in relation to FIG. 2.

After command messages intended for a first subset of computing instances identified in a first page of identifiers obtained from the tag service have been sent, as in block 612, a determination may be made whether a second page of identifiers for a second subset of computing instances may need to be obtained, subject to the error threshold not being exceeded, as in block 618. For example, where the set of target computing instances is large, additional requests for pages of identifiers may be made to the tag service. In the case that a second page of identifiers is obtained from the tag service, as in block 604, command messages may be generated for each of the computing instance identifiers and sent to the computing instances subject to the sent rate and error threshold as in blocks 606, 608, 610, 614, and 618. The process of obtaining additional pages of identifiers from the tag service may be repeated until each of the target computing instances associated with the tags receives a command message, or until the command is terminated as described earlier in relation to FIG. 2.

Figure 7:
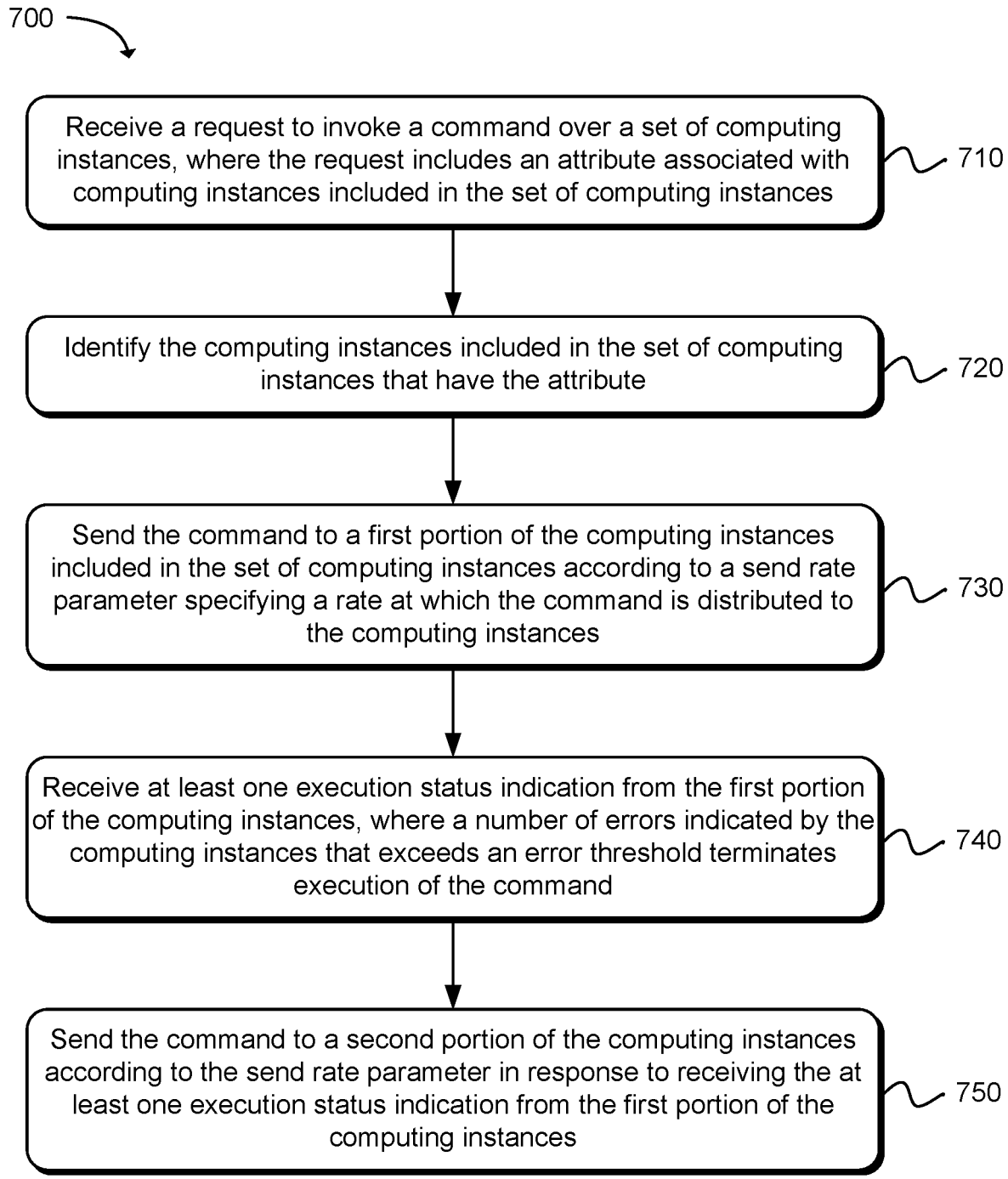
FIG. 7 is a flow diagram that illustrates an example method for invoking a command over a set of computing instances.

FIG. 7 is a flow diagram that illustrates an example method 700 for invoking a command over a set of computing instances. Starting in block 710, a request to invoke a command over a set of computing instances may be received. The request may include an attribute associated with computing instances included in the set of computing instances. In one example, the attribute may be identifiers for the computing instances included in the set of computing instances. In another example, the attribute may be a tag assigned to the computing instances included in the set of computing instances and the tag may be used to identify the computing instances.

As in block 720, computing instances included in the set of computing instances that have the attribute may be identified, and as in block 730, the command may be sent to a first portion of the computing instances included in the set of computing instances according to a send rate parameter specifying a rate at which the command may be distributed to the computing instances.

As in block 740, at least one execution status indication may be received from the computing instances. A number of errors indicated by the computing instances that exceeds an error threshold may result in terminating execution of the command. In one example, execution status indications may be managed using a tree data structure. For example, a command progress object may be updated with an execution status indication received from the computing instances. The command progress object may indicate a completed count representing completed commands and an error count representing errors.

As in block 750, the command may be sent to a second portion of the computing instances according to the send rate parameter in response to receiving the at least one execution status indication from the first portion of the computing instances. Thus, as command invocations complete, additional command invocations may be sent to the computing instances that have not yet received a command invocation.

As status indications are received, child nodes of the command progress object may be updated with the status indications, where a completed count or error count of the child node may be incremented, and the command progress object may be updated with the completed count and the error count of the child node after a number of updates to the child node.

Figure 8:
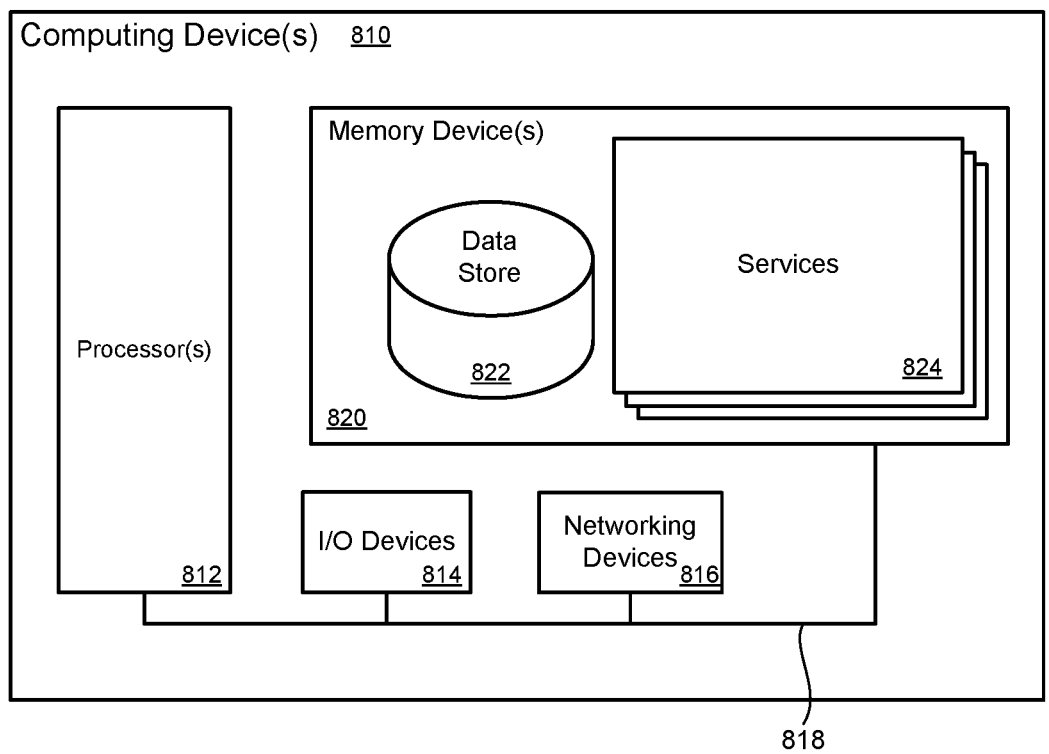
FIG. 8 is block diagram illustrating an example of a computing device that may be used to execute a method for invoking a command over a set of computing instances.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain services 824 that are executable by the processor(s) 812 and data for the services 824. In one example, the memory device 820 may contain a command service, a queue service, a worker processing service, a tag service, a message service, and other services. The services 824 may execute the functions described earlier. A data store 822 may also be located in the memory device 820 for storing data related to the services 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for distributing a command to a set of computing instances, comprising:
    at least one processor;
    at least one memory device including instructions that, when executed by the at least one processor, cause the system to:
    receive a request to invoke the command in batches over the set of computing instances managed within a service provider environment, wherein the command is an instruction to a software agent hosted on a computing instance to perform an administrative task associated with the computing instance, and the request includes an attribute that identifies at least one tag assigned to computing instances included in the set of computing instances;
    identify a first subset of computing instances included in the set of computing instances assigned the at least one tag, wherein a number of computing instances included in a subset of computing instances is determined using a subset parameter;
    send the command to computing instances included in the first subset of computing instances according to a send rate parameter specifying a rate at which the command is sent to the computing instances;
    receive status indications from the computing instances indicating statuses of command executions by the computing instances, wherein a number of errors executing the command that exceed an error threshold causes termination of the execution of the command;
    identify, based at least in part on the subset parameter, a second subset of computing instances included in the set of computing instances assigned the at least one tag; and
    send the command to software agents hosted on computing instances included in the second subset of computing instances according to the send rate parameter.

2. A system as in claim 1, wherein the memory device includes instructions that, when executed by the processor, cause the system to:
    determine that errors executing the command indicated by the computing instances exceeds the error threshold, wherein the error threshold specifies a number of errors indicated by the computing instances or a percentage of computing instances indicating errors;
    terminate sending the command to the computing instances; and
    set a command status to indicate a failure to execute the command.

3. A system as in claim 1, wherein the memory device includes instructions that, when executed by the processor, cause the system to determine that status indications received from the first subset of computing instances do not indicate errors that exceed the error threshold before sending the command to the computing instances included in the second subset of computing instances.

4. A computer implemented method, comprising:
    receiving a request to invoke a command over a set of computing instances, wherein the command is an instruction to a software agent hosted on a computing instance to perform an administrative task associated with the computing instance, and the request includes an attribute that identifies a tag assigned to the computing instances included in the set of computing instances;

identifying the computing instances included in the set of computing instances using the tag;

sending the command to a first portion of the computing instances included in the set of computing instances that have the attribute according to a send rate parameter specifying a rate at which the command is distributed to the computing instances;

receiving at least one execution status indication from the first portion of the computing instances, wherein a number of errors indicated by the computing instances that exceeds an error threshold terminates execution of the command; and sending the command to a second portion of the computing instances according to the send rate parameter in response to receiving the at least one execution status indication from the first portion of the computing instances.

5. A method as in claim 4, wherein the computing instances are located in a customer data center.

6. A method as in claim 4, wherein receiving the request to invoke the command further comprises:
receiving the request to invoke the command from a client at a command service configured to handle the request to invoke the command;
creating a command object for the command that includes command parameters and represents a state of the command; and
storing the request in a command queue for processing by a worker thread.

7. A method as in claim 6, further comprising:
retrieving the command object by the worker thread; and
obtaining the attribute from the command object by the worker thread.

8. A method as in claim 4, wherein the attribute associated with computing instances included in the request to invoke the command further comprises individual identifiers for the computing instances included in the set of computing instances.

9. A method as in claim 4, further comprising creating an invocation object for each computing instance included in the set of computing instances, wherein the invocation object represents a state of execution of a command invocation of the command by a computing instance.

10. A method as in claim 9, further comprising:
detecting a timeout of a command execution for a computing instance included in the set of computing instances; and
updating the invocation object associated with the computing instance to indicate the timeout.

11. A method as in claim 9, further comprising:
determining that the number of errors indicated by the computing instances exceeds the error threshold; and
updating invocation objects associated with computing instances that have not received a command invocation of the command to indicate that the command is terminated.

12. A method as in claim 4, further comprising updating a command progress object with a status indication received from the computing instances, wherein the command progress object indicates a completed count representing completed commands and an error count representing errors.

13. A method as in claim 12, wherein updating the command progress object further comprises:

updating a child node of the command progress object with the status indication, wherein the completed count or error count of the child node is incremented; and
updating the command progress object with the completed count or the error count of the child node after a number of updates to the child node.

14. A method as in claim 6, further comprising:
detecting a timeout of the command; and
updating the command object for the command to indicate that the command timed out.

15. A method as in claim 6, further comprising:
receiving a request to cancel the command at the command service configured to handle the request to cancel the command;
updating the command object to indicate that the command is canceled; and
putting the request to cancel the command in the command queue for processing by the worker thread.

16. A computer implemented method, comprising:
retrieving from a command queue a request to invoke a command over a set of computing instances, wherein the command is an instruction to a software agent hosted on a computing instance to perform an administrative task associated with the computing instance, and the request includes an attribute that identifies a tag assigned to computing instances included in the set of computing instances;
obtaining identifiers for the computing instances assigned the tag;
generating a command message for each of the computing instances indicated by the identifiers, wherein command messages include instructions for computing instances to execute the command;
sending a portion of the command messages as constrained by a send rate parameter to a messaging service that delivers the portion of the command messages to the computing instances indicated by the identifiers included in the portion of the command messages, wherein the send rate parameter specifies a rate at which the portion of the command messages are sent to the computing instances;
queuing unsent command messages in a delay queue for an amount of time;
retrieving a number of the unsent command messages as determined by the send rate parameter from the delay queue after the amount of time; and
sending the number of the unsent command messages to the messaging service that delivers the unsent command messages to the computing instances indicated by the identifiers included in the unsent command messages.

17. A method as in claim 16, further comprising obtaining the send rate from customer settings, wherein the send rate is a default specified by a service provider and is overridable by a customer.

18. A method as in claim 16, further comprising:
retrieving status messages containing execution status indications sent by the computing instances;
determining that a number of errors indicated in the status messages exceeds an error threshold; and
terminating execution of the command.

19. A method as in claim 16, wherein obtaining the identifiers for the computing instances further comprises obtaining at least one page of identifiers for the computing instances assigned the tag, wherein a number of identifiers included in the at least one page of identifiers is specified by a customer.

* * * * *